US012523428B2

(12) United States Patent
Duan et al.

(10) Patent No.: US 12,523,428 B2
(45) Date of Patent: Jan. 13, 2026

(54) HEAT DISSIPATION ASSEMBLY AND HEAT DISSIPATER

(71) Applicant: ZTE CORPORATION, Shenzhen (CN)

(72) Inventors: Kaiwen Duan, Shenzhen (CN); Shuai Li, Shenzhen (CN); Xin Liu, Shenzhen (CN); Fan Liu, Shenzhen (CN); Zhidong Nie, Shenzhen (CN); Yan Wang, Shenzhen (CN); Mingming Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 134 days.

(21) Appl. No.: 18/693,398

(22) PCT Filed: Mar. 14, 2022

(86) PCT No.: PCT/CN2022/080743
§ 371 (c)(1),
(2) Date: Mar. 19, 2024

(87) PCT Pub. No.: WO2023/045275
PCT Pub. Date: Mar. 30, 2023

(65) Prior Publication Data
US 2024/0393053 A1    Nov. 28, 2024

(30) Foreign Application Priority Data
Sep. 27, 2021    (CN) .......................... 202111134798.5

(51) Int. Cl.
*F28D 1/03*    (2006.01)
*F28D 21/00*    (2006.01)

(52) U.S. Cl.
CPC .... *F28D 1/0341* (2013.01); *F28D 2021/0031* (2013.01)

(58) Field of Classification Search
CPC ........... F28D 1/0341; F28D 2021/0031; H01L 23/427; H01L 21/4882; H01L 23/4006; H05K 7/20
(Continued)

(56) References Cited

U.S. PATENT DOCUMENTS 6,399,217 B1 *   6/2002   Lee ....................... F28F 21/089
                                                                 428/614
7,604,044 B2 *  10/2009   Kawakubo .......... F28D 1/05375
                                                                 165/178
(Continued)

FOREIGN PATENT DOCUMENTS

CN        101413760 A      4/2009
CN        103517620 A      1/2014
(Continued)

OTHER PUBLICATIONS

International Searching Authority. International Search Report and Written Opinion for PCT Application No. PCT/CN2022/080743 and English translation, mailed Jun. 10, 2022, pp. 1-10.
(Continued)

*Primary Examiner* — Jon T. Schermerhorn, Jr.
(74) *Attorney, Agent, or Firm* — Vivacqua Crane, PLLC

(57) ABSTRACT

A heat dissipation assembly and a heat dissipator are disclosed. The heat dissipation assembly may include: a base plate bottom; a base plate cover connected to the base plate bottom and forming a heat collection cavity for concentrating heat; a turbulation component provided in the heat collection cavity, the turbulation component comprising at least one turbulation piece; and a plurality of heat dissipation components connected to the base plate cover, wherein the heat dissipation components are provided with at least one heat dissipation pipeline, the heat dissipation pipeline is provided in communication with the heat collection cavity.

20 Claims, 8 Drawing Sheets

(58) Field of Classification Search
USPC .......................................................... 165/153
See application file for complete search history.

(56) References Cited

U.S. PATENT DOCUMENTS

| | | | |
|---|---|---|---|
| 9,835,380 B2* | 12/2017 | Kupiszewski | .......... F01D 25/12 |
| 11,982,492 B2* | 5/2024 | Dandan | .................. B23P 15/26 |
| 12,078,426 B2* | 9/2024 | Martinez | ................. F28F 13/12 |
| 2010/0032147 A1 | 2/2010 | Valenzuela | |
| 2012/0305218 A1* | 12/2012 | Masefield | ............. H01L 23/473 |
| | | | 165/67 |
| 2013/0340978 A1 | 12/2013 | Agostini et al. | |
| 2017/0335740 A1* | 11/2017 | Dries | ........................ F01N 5/02 |
| 2019/0212066 A1 | 7/2019 | Lan | |
| 2021/0105912 A1 | 4/2021 | Takabayashi et al. | |
| 2021/0239402 A1* | 8/2021 | Martinez | ................. F28F 13/12 |
| 2022/0373270 A1* | 11/2022 | Otomo | .................... F28F 3/046 |
| 2025/0277587 A1* | 9/2025 | Cochran | ................. F24C 7/046 |

FOREIGN PATENT DOCUMENTS

| | | | | |
|---|---|---|---|---|
| CN | 108260327 A | | 7/2018 | |
| CN | 207733155 U | | 8/2018 | |
| CN | 110726326 A | * | 1/2020 | .............. F28D 7/00 |
| CN | 210135781 U | | 3/2020 | |
| CN | 211831654 U | | 10/2020 | |
| CN | 211982360 U | | 11/2020 | |
| CN | 117936473 A | * | 4/2024 | ............. H01L 21/56 |
| JP | H0234993 A | * | 2/1990 | ............. F28F 3/12 |
| JP | 2021132169 A | | 9/2021 | |
| JP | 7600952 B2 | * | 12/2024 | ........... H01R 9/2425 |
| KR | 20060086920 A | * | 8/2006 | ................ F28F 3/12 |
| TW | 201925711 A | | 7/2019 | |
| TW | 201925978 A | | 7/2019 | |
| WO | 2011148505 A1 | | 12/2011 | |
| WO | 2018179314 A1 | | 10/2018 | |
| WO | WO-2025082335 A1 | * | 4/2025 | ............... F28D 1/03 |

OTHER PUBLICATIONS

Industrial Property Cooperation Center (IPCC). Search Report for JP Application No. 2024-516647 and English translation, mailed Feb. 25, 2025, pp. 1-38.
Japan Patent Office. Notice of Reasons for Refusal for JP Application No. 2024-516647 and English translation, mailed Feb. 25, 2025, pp. 1-8.
The State Intellectual Property Office of People's Republic of China. Second Office Action for CN Application No. 202111134798.5 and English translation, mailed Oct. 23, 2024, pp. 1-16.
European Patent Office. Extended European Search Report for EP Application No. 22871340.0, mailed Jan. 7, 2025, pp. 1-10.
Baek et al. "Reconfigurable thermoelectric generators for vehicle radiators energy harvesting," IEEE/ACM International Symposium on Low Power Electronics and Design (ISLPED), 2017, pp. 1-6.
The State Intellectual Property Office of People's Republic of China. First Office Action for CN Application No. 202111134798.5 and English translation, mailed Jul. 3, 2024, pp. 1-8.
The State Intellectual Property Office of People's Republic of China. First Search Report for CN Application No. 202111134798.5 and English translation, mailed Jul. 2, 2024, pp. 1-6.
Xinyi. "Experimental and numerical investigation of hydrodynamics and heat transfer in rectangular channel," South China University of Technology, Apr. 2012, pp. 1-163.

\* cited by examiner

HEAT DISSIPATION ASSEMBLY AND HEAT DISSIPATER

CROSS-REFERENCE TO RELATED APPLICATION

This application is a national stage filing under 35 U.S.C. § 371 of international application number PCT/CN2022/080743, filed Mar. 14, 2022, which claims priority to Chinese patent application No. 202111134798.5, filed Sep. 27, 2021. The contents of these applications are incorporated herein by reference in their entirety.

TECHNICAL FIELD

The present disclosure relates to the field of electronic technology, and more particularly, to a heat dissipation assembly and a heat dissipator.

BACKGROUND

With the rapid advancement of power electronics technology, electronic devices are evolving towards larger capacity, higher power, higher integration, and lighter weight, thereby leading to an increasing heat consumption density of the device system and also increasing requirements for environmental adaptability. Consequently, the effective dissipation of heat from electronic devices has emerged as a critical bottleneck impeding industry development.

Using the heat dissipator for an active antenna unit (AAU) as an example, its requirement for lightweight heat dissipation is primarily limited by the internal bottleneck of large power consumption by chips. Some technical schemes may use 3D VC-form heat dissipators to perform thermal relief in local high heat flow regions, but this technical form suffers from problems such as a high risk of leakage, a low reliability, a poor pressure-bearing capability, and susceptibility to deformation; Meanwhile, for the 3D VC heat dissipation module, when it is placed vertically, the top of its heat collection cavity is prone to dry burning, which leads to the risk of over-temperature failure of the corresponding chip.

The effectiveness of the 3D VC heat dissipation module is intimately linked to its structural thermal design. In order to further improve the heat dissipation capability of the 3D VC module itself and the whole machine, the design of the inner cavity of the heat dissipation module and the assembly structure of the heat dissipation module with the outer shell urgently need to be improved and optimized.

SUMMARY

The present disclosure provides a heat dissipation assembly and a heat dissipator.

In accordance with a first aspect of the present disclosure, an embodiment provides a heat dissipation assembly, including: a base plate bottom; a base plate cover connected to the base plate bottom and forming a heat collection cavity for concentrating heat; a turbulation component provided in the heat collection cavity, the turbulation component including at least one or two turbulation pieces and turbulation columns, where the height of the turbulation piece is equal to that of the heat collection cavity, the turbulation piece is at least partially arranged closely against the base plate bottom, and the turbulation piece is at least partially arranged closely against the base plate cover, side walls of the turbulation piece are provided between the base plate cover and the base plate bottom, and the side walls are configured to support the base plate cover and the base plate bottom, and a cavity is provided between adjacent side walls of the turbulation piece; and a plurality of heat dissipation components connected to the base plate cover, the heat dissipation components are provided with at least one or two heat dissipation pipelines, the heat dissipation pipeline is provided in communication with the heat collection cavity.

In accordance with a second aspect of the present disclosure, an embodiment provides a heat dissipator including a heat dissipation assembly described in the first aspect.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

The present disclosure will be further explained hereinafter with reference to the accompanying drawings and embodiments.

DETAILED DESCRIPTION

Figure 1:
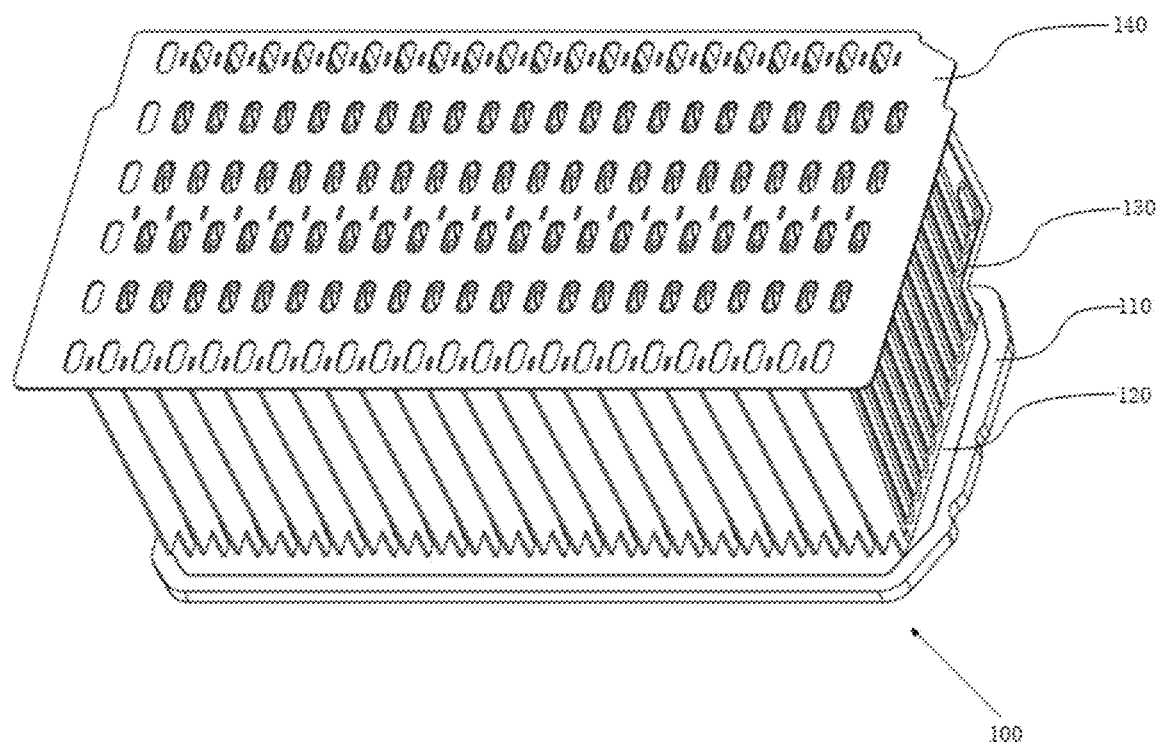
FIG. 1 is a structural schematic diagram of a heat dissipation assembly as provided in an embodiment of the present disclosure.

This section will describe specific embodiments of the present disclosure in detail, and preferable embodiments of the present disclosure are shown in the accompanying drawings. The accompanying drawings are used to supplement the text description of the specification with graphic illustrations, so that each technical feature and the overall technical scheme of the present disclosure can be intuitively and vividly understood. However, the accompanying drawings should not be construed as limiting the scope of protection application the present disclosure.

In the description of the present disclosure, the meaning of "several" is one or a plurality; the meaning of "a plurality of" is two or more; "greater than", "less than", "more than", etc. are to be construed as excluding a given figure; and "above", "below", "within", etc. are to be construed as including a given figure. If "first" and "second", etc. are referred to, it is only for the purpose of distinguishing technical features, and shall not be construed as indicating or implying relative importance or implying the number of the indicated technical features or implying the sequence of the indicated technical features.

In the description of the present disclosure, unless otherwise explicitly defined, the terms such as "arrange", "install", and "connect" should be construed in a broad sense, and those skilled in the art can determine the specific meanings of the above terms in the present disclosure in a rational way in conjunction with the specific contents of the technical schemes.

An embodiment of the present disclosure provides a heat dissipation assembly and a heat dissipator, where the heat dissipation assembly includes a base plate bottom, a base plate cover, a turbulation component, and a plurality of heat dissipation components, where the base plate cover is connected to the base plate bottom and forms a heat collection cavity for concentrating heat; the turbulation component includes a turbulation piece and is provided in the heat collection cavity, where the turbulation piece is of equal height to the heat collection cavity, the turbulation piece is at least partially arranged closely against the base plate bottom, and the turbulation piece is at least partially arranged closely against the base plate cover, side walls of the turbulation piece being provided between the base plate cover and the base plate bottom, and the side walls of the turbulation piece being configured to support the base plate cover and the base plate bottom, and a cavity being provided between adjacent side walls of the turbulation piece; and the plurality of heat dissipation components are connected to the base plate cover, the heat dissipation components being provided with at least one heat dissipation pipeline, with the heat dissipation pipeline being in communication with the heat collection cavity. The top face of the turbulation piece closely fits the inner cavity face of the base plate cover, the bottom face of the turbulation piece closely fits the inner cavity face of the base plate bottom, and the side walls of the turbulation piece are sandwiched between the base plate cover and the base plate bottom to form a support, thus enabling the pressure-bearing capability, the structural strength and the reliability of the heat dissipator to be enhanced; a cavity is provided between adjacent side walls of the turbulation piece, where the cavity can be used as a gas-liquid separation channel to make the liquid working medium flow along the wall face and make the gaseous working medium rise through the center of the cavity and be separated, thereby improving the two-phase circulation efficiency of the inner cavity of the base plate; and at the same time, when the high-temperature gas-liquid working medium flows through the turbulation piece, the high-temperature gas-liquid flow is obstructed by the turbulation piece, so that the high-temperature gas-liquid flow bypasses the turbulation piece and forms a vortex on the side of the turbulation piece, which destroys the thermal boundary layer on the surface of the turbulation piece, so that the thermal resistance can be significantly reduced, and the heat transfer coefficient can be increased, thus functioning to enhance heat transfer.

The embodiments of the present disclosure will be further explained below with reference to the accompanying drawings.

Figure 2:
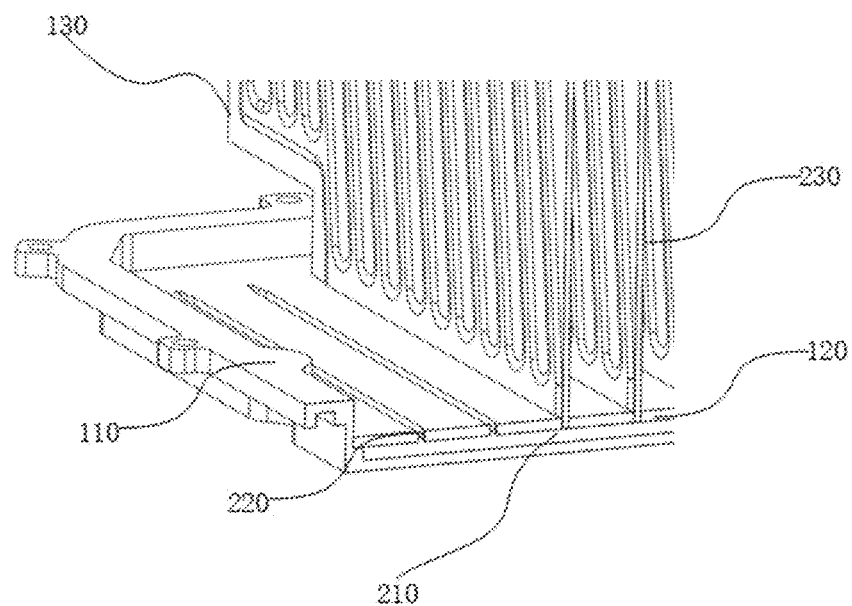
FIG. 2 is a partial schematic diagram of a connecting structure of a base plate and a heat dissipation component of a heat dissipation assembly as provided in an embodiment of the present disclosure.
Figure 3:
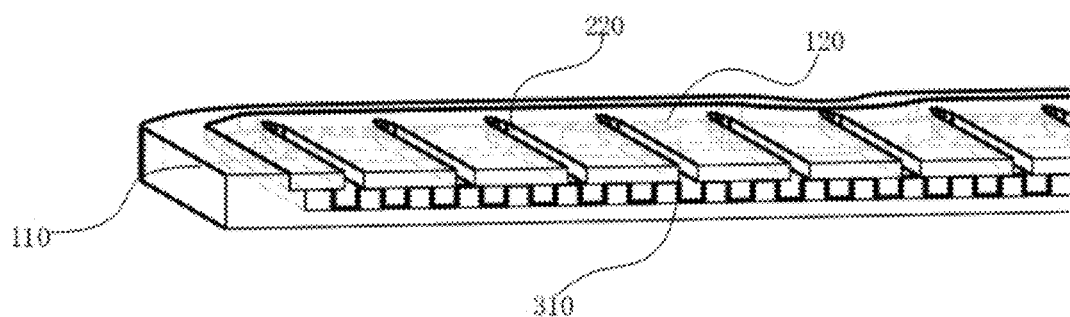
FIG. 3 is a partial schematic diagram of a turbulation piece of a heat dissipation assembly being disposed in a base plate as provided in an embodiment of the present disclosure.

FIGS. 1-3 illustrate a heat dissipation assembly 100 provided in an embodiment of the present disclosure, the heat dissipation assembly 100 including a base plate bottom 110, a base plate cover 120, a turbulation component, and a plurality of heat dissipation components 130, where the base plate cover 120 is connected to the base plate bottom 110 and forms a heat collection cavity 210 for concentrating heat; The turbulation component is provided in the heat collection cavity 210, and the turbulation component includes at least one turbulation piece 310 and turbulation column, the turbulation piece 310 being at least partially arranged closely against the base plate bottom 110, and the turbulation piece 310 being at least partially arranged closely against the base plate cover 120, the plurality of heat dissipation components 130 are connected to the base plate cover 120, and the heat dissipation component 130 is provided with at least one heat dissipation pipeline 230, the heat dissipation pipeline 230 being provided in communication with the heat collection cavity 210. The provision of the turbulation piece 310 can address the reliability and pressure resistance problems of the heat dissipator; and at the same time, when the high-temperature gas-liquid flows through the turbulation piece 310, the high-temperature gas-liquid flow is obstructed by the turbulation piece 310, so that the high-temperature gas-liquid flow bypasses the turbulation piece 310 and forms a vortex on the side of the turbulation piece 310, which destroys the thermal boundary layer on the surface of the turbulation piece 310, so that the thermal resistance can be significantly reduced, and the heat transfer coefficient can be increased, thus functioning to enhance heat transfer. That is, the provision of the turbulation piece 310, in addition to addressing the reliability and pressure resistance problems of the heat dissipator, can also serve to reduce the thermal resistance and increase the heat transfer coefficient.

As shown in FIG. 3, in an embodiment, the heat collection cavity is provided with a plurality of sets of continuous turbulation pieces 310 of the same height as the heat collection cavity 210, which can be used to enhance the strength of welding between the base plate bottom 110 and the base plate cover 120; the top face of the turbulation piece 310 is arranged closely against the inner cavity face of the base plate cover 120, the bottom face of the turbulation piece 310 is arranged closely against the inner cavity face of the base plate bottom 110, and the side walls of the turbulation piece 310 are sandwiched between the base plate cover 120 and the base plate bottom 110 to form a support, thus enabling the pressure-bearing capability, the structural strength and the reliability of the heat dissipator to be enhanced; and a separate cavity can be separated between adjacent side walls of the turbulation pieces 310 as a gas-liquid separation channel to make the liquid working medium flow along the wall face and make the gaseous working medium rise through the center of the cavity and be separated, thereby improving the two-phase circulation efficiency of the inner cavity of the base plate.

Figure 4:
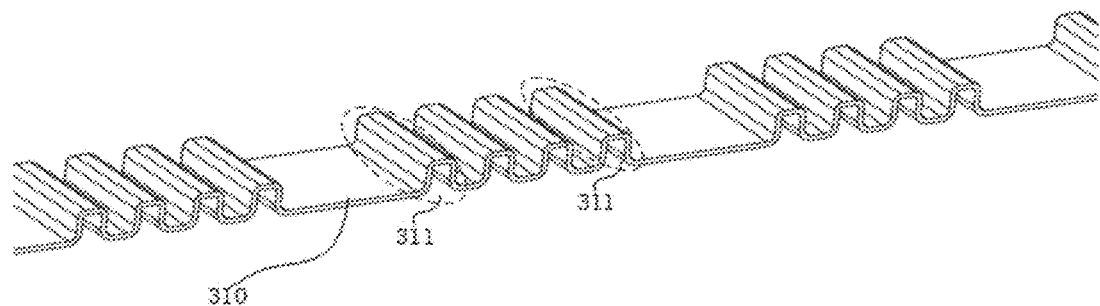
FIG. 4 is a first schematic diagram of the structure of a turbulation piece in a heat dissipation assembly as provided in an embodiment of the present disclosure.
Figure 5:
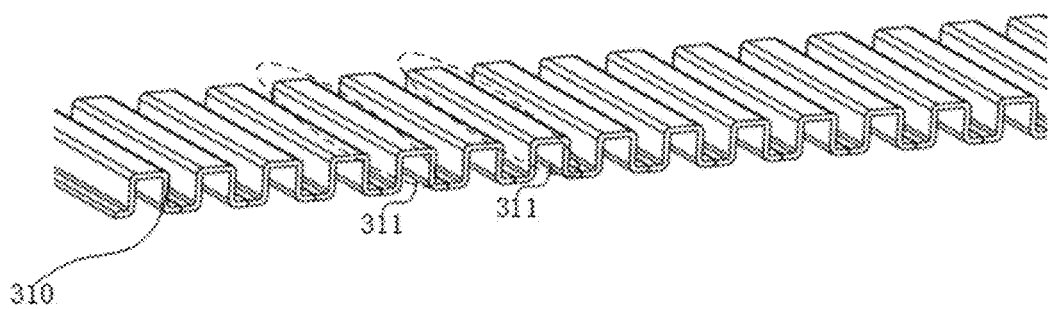
FIG. 5 is a second schematic diagram of the structure of a turbulation piece in a heat dissipation assembly as provided in an embodiment of the present disclosure.
Figure 6:
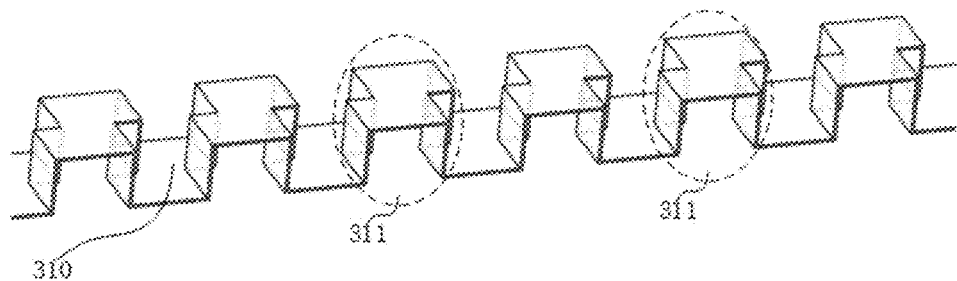
FIG. 6 is a third schematic diagram of the structure of a turbulation piece in a heat dissipation assembly as provided in an embodiment of the present disclosure.

It can be understood that the structure of the turbulation piece 310 may be varied, such as, for example, simple turbulation piece 310 structures as in FIGS. 4 to 5 and a complex turbulation piece 310 structure as in FIG. 6 that is formed by a combination of a plurality of simple turbulation piece 310 structures, in the complex turbulation piece 310 structure, two simple turbulation pieces 310 are arranged in close proximity to each other, and the side walls form a locally staggered overlapping structure in an unaligned manner, and such a locally staggered overlapping structure of the turbulation component makes its pressure-bearing performance stronger compared to simple turbulation pieces 310, and this embodiment does not impose any specific limitation on the structure of the turbulation piece 310.

It is to be noted that, inside the heat collection cavity 210, the arrangement can be made in a manner of separate spot-welding positioning of each turbulation piece 310 of the plurality of turbulation pieces 310, or in a manner of integral positioning of a large-area turbulation piece 310; and adjacent turbulation pieces 310 may be arranged in a close against manner or in a spaced apart manner, and the side walls of the turbulation pieces 310 may be aligned in parallel or may form a locally staggered overlapping structure in an unaligned manner, and this embodiment does not impose any specific limitation on the setting of the turbulation pieces 310.

It is to be noted that the turbulation piece 310 includes a plurality of array elements 311, as shown in FIGS. 4 to 6, where the cross-sectional shape of the array elements 311 may be a zig-zag shape, a trapezoidal shape, a rectangular shape, a Z-shape, a V-shape or a W-shape, and this embodiment does not impose any specific limitation thereon.

It is to be noted that the heat dissipation component 130 is a toothed piece provided with heat dissipation pipelines 230, and that the heat dissipation component 130 and the base plate cover 120 may be provided vertically or at an inclination to each other, and this embodiment does not impose any specific limitation thereon.

Further, for the heat dissipation component 130 with the heat dissipation pipelines 230, it can be understood that flowing of the gas-liquid refrigerant can be realized in the heat dissipation pipelines 230, where when the temperature of the gas-liquid refrigerant exceeds a threshold value, the liquid gas-liquid refrigerant will vaporize, and the vaporized gas-liquid refrigerant will flow upwardly and exchange heat with the cold air in the external environment through the surface of the heat dissipation component 130, and when the temperature of the vaporized gas-liquid refrigerant is lowered to below the threshold value, the vaporized gas-liquid refrigerant will be liquefied, and the liquefied gas-liquid refrigerant will flow downward under the action of gravity, thereby realizing circular flowing.

Figure 7:
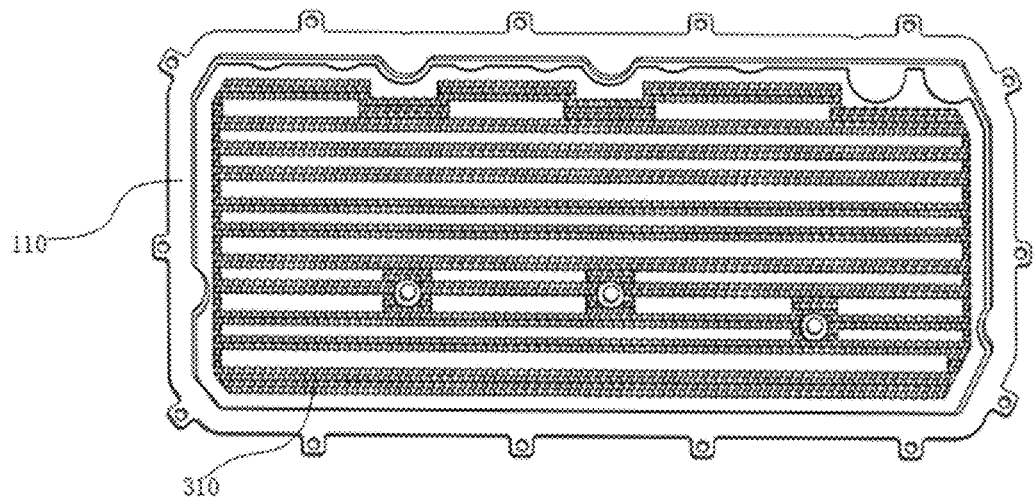
FIG. 7 is a first schematic diagram of the structure of a turbulation component in a heat dissipation assembly as provided in an embodiment of the present disclosure.

As shown in FIG. 7, in an embodiment, when the large-area turbulation piece 310 is provided in the base plate bottom 110 in an integral positioning manner, local regions of the turbulation piece 310 may be hollowed out by means of radium engraving, etc., so as to reduce the resistance to flow in the heat collection cavity 210; and at the same time, with the large-area integral spoiler piece 310 structure, the structural connectivity between the turbulation pieces 310 is utilized for integral positioning, which reduces the risk of the turbulation pieces 310 being offset and displaced and thus blocking the heat dissipation pipelines 230 during the welding process.

Figure 8:
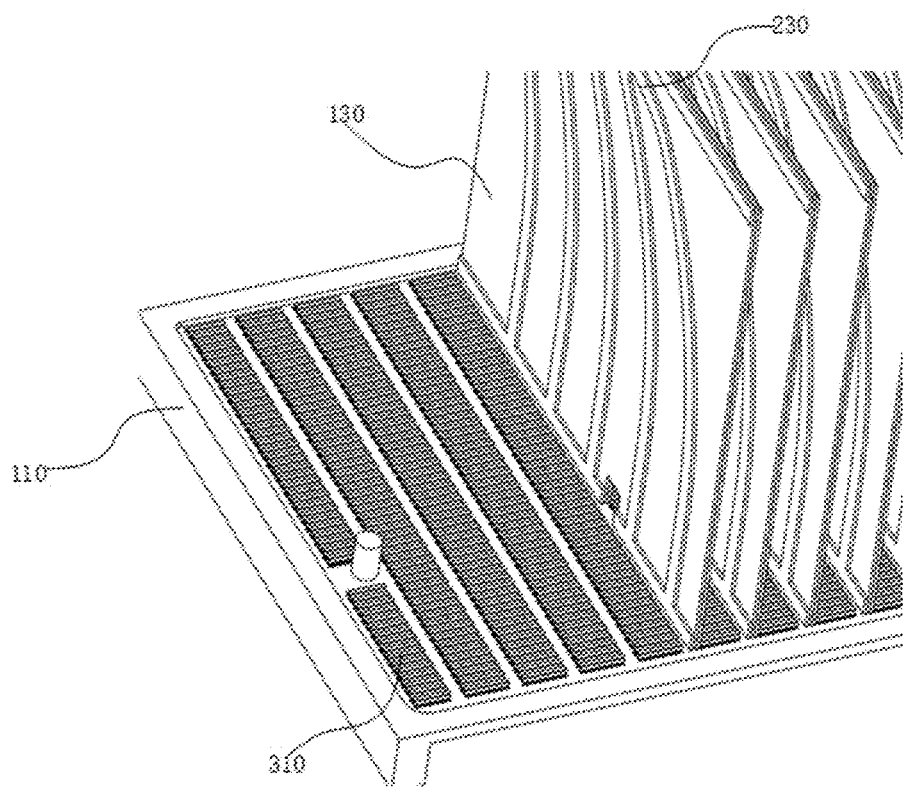
FIG. 8 is a second schematic diagram of the structure of a turbulation component in a heat dissipation assembly as provided in an embodiment of the present disclosure.

As shown in FIG. 8, in an embodiment, in use, the cavities for the turbulation pieces 310 are approximately perpendicular to the direction of gravity, the turbulation pieces 310 and the heat dissipation components 130 are provided in a spaced and staggered manner, no turbulation pieces 310 are provided in the base plate cover 120 at the positions of the through slots 220 for gas-liquid exchanges with the heat dissipation components 130, and the edge spacing between the turbulation pieces 310 and the through slots 220 for gas-liquid exchanges is greater than or equal to 1 mm.

Figure 9:
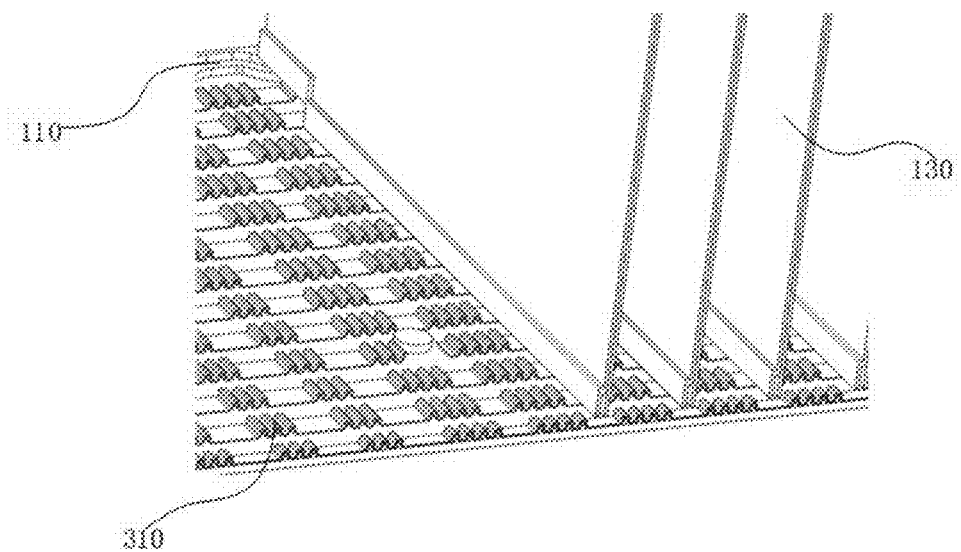
FIG. 9 is a third schematic diagram of the structure of a turbulation component in a heat dissipation assembly as provided in an embodiment of the present disclosure.

As shown in FIG. 9, in an embodiment, when the cavities for the turbulation pieces 310 are approximately parallel to the direction of gravity, a flat sheet structure may be used at the position of the through slot 220 for gas-liquid exchange as the transition for the turbulation piece 310, where the bottom face of the flat sheet closely fit the inner cavity face of the base plate bottom 110, and a gap space is retained between the top face of the flat sheet and the through hole for gas-liquid exchange, which means that the portion of the turbulation piece 310 arranged closely against the base plate cover 120 is provided in a staggered manner with the through slot 220 to prevent the turbulation piece 310 from obscuring the through slot 220. Here, the edge spacing between the edge of the flat sheet and the through slot 220 for gas-liquid exchange is greater than or equal to 1 mm.

Figure 10:
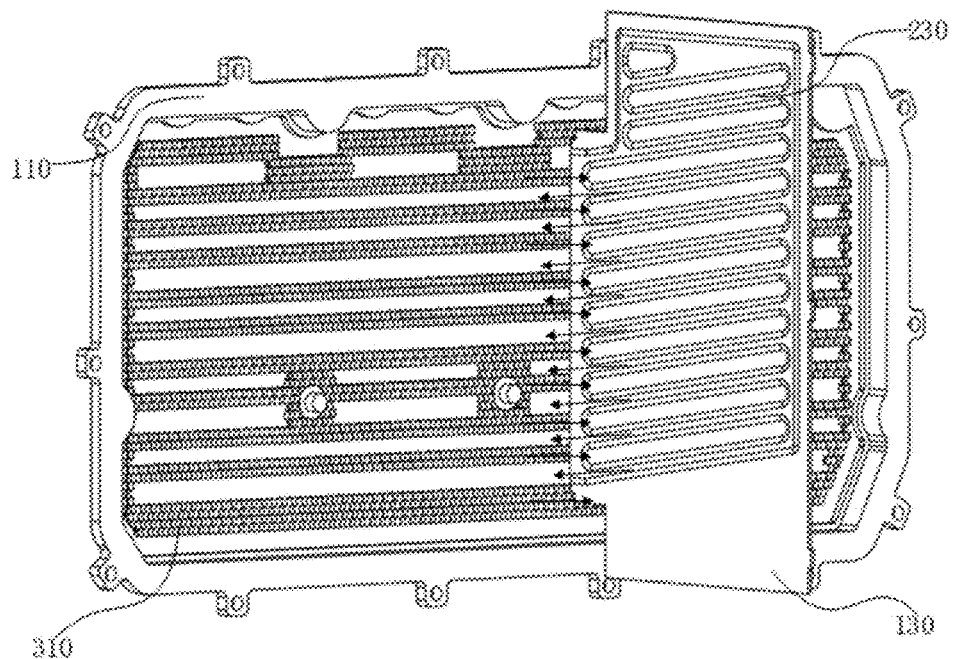
FIG. 10 is a structural schematic diagram of a turbulation component of a heat dissipation assembly being provided in a staggered manner with a heat dissipation pipeline of the heat dissipation component as provided in an embodiment of the present disclosure.

As shown in FIG. 10, in an embodiment, when the cavities for the turbulation pieces 310 are approximately parallel to the direction of gravity, the portions of the individual turbulation pieces 310 that closely fit the base plate cover 120 are provided in a staggered manner with the heat dissipation pipelines 230 to prevent the turbulation pieces 310 from obscuring the heat dissipation pipelines 230, which results in obstructing gas-liquid exchange between the heat collection cavity 210 and the heat dissipation pipelines 230 of the heat dissipation component 130.

In an embodiment, as shown in FIG. 3, the heat collection cavity 210 is separated inside the base plate bottom 110 by providing a circumferential sinking stage, and the connection strength and airtightness between the base plate bottom 110 and the base plate cover 120 is strengthened by the circumferential sinking stage, and it is to be noted that the circumferential sinking stage may be of an integral structure with the base plate bottom 110, or it may be of an integral structure with the base plate cover 120, and this embodiment does not impose any specific limitation thereon. The circumferential sinking stage is provided in the inner cavity of the base plate bottom 110, the bottom face of the base plate cover 120 is closely connected to the top face of the circumferential sinking stage, the sides of the base plate cover 120 are provided in a close against manner with the peripheral face of the inner cavity of the base plate bottom 110, and the heat collection cavity 210 is separated between the base plate cover 120 and the base plate bottom 110 by the circumferential sinking stage.

Figure 11:
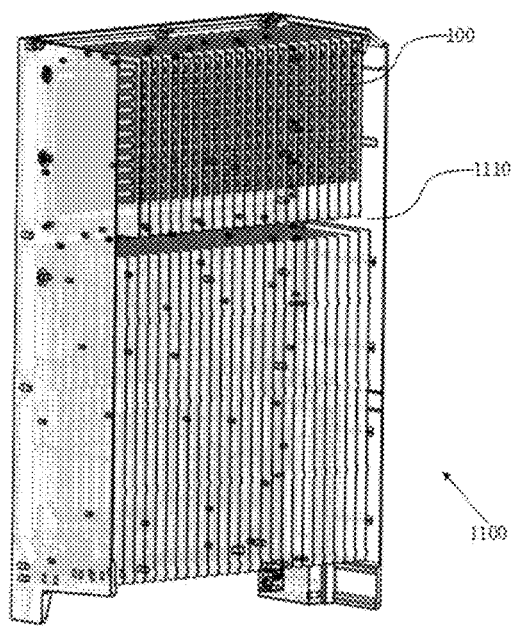
FIG. 11 is a structural schematic diagram of a heat dissipator as provided in an embodiment of the present disclosure.
Figure 12:
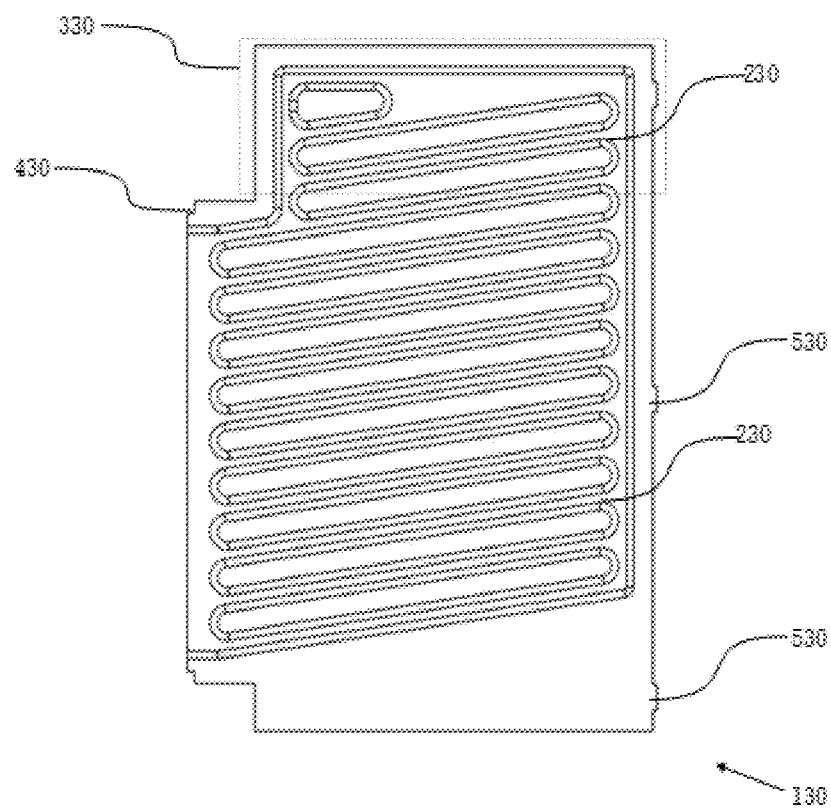
FIG. 12 is a structural schematic diagram of a heat dissipation component of a heat dissipation assembly as provided in an embodiment of the present disclosure.

As shown in FIGS. 11 to 12, the heat dissipation assembly 100 is assembled with the outer shell 1110 to form the heat dissipator 1100, and the heat dissipation component 130 can reduce the step with the toothed pieces on the outer shell 1110 by the outwardly extending structure 330 so as to compensate for the heat dissipation area of the heat dissipation component 130. It can be understood that the outwardly extending structure 330 of the heat dissipation component 130 can partially replace or wholly replace the toothed pieces of the outer shell 1110, and that the heat dissipation pipelines 230 in communication with the heat collection cavity 210 may be arranged in the outwardly extending structure 330; and by means of the upper outwardly extending structure 330 of the heat dissipation component 130, the heat dissipation component 130 wholly replaces the upper side toothed pieces of the outer shell 1110 in the height direction, and at the same time, the upper outwardly extending structure 330 is provided with heat dissipation pipelines 230 in communication with the heat collection cavity 210, so as to enable the heat dissipation component 130 to increase the condensation area and the heat dissipation area, and to further pull up the height of the liquid level in the heat collection cavity 210, which can alleviate the dry burning problem at the top of the heat collection cavity 210, and improve the two-phase circulation efficiency and the heat dissipation efficiency of the heat dissipation assembly.

In an embodiment, as shown in FIGS. 2 and 12, since the base plate cover 120 is provided with a through slot 220 that corresponds to the heat dissipation component 130 and is used for gas-liquid exchange, the bottom of the heat dissipation component 130 can be inserted into the through slot 220 so as to enable the heat dissipation pipelines 230 of the heat dissipation component 130 to realize communication with the heat collection cavity 210 of the base plate, and in order to prevent the problem of blocking the gas-liquid exchange caused by over-insertion of the heat dissipation component 130 into the heat collection cavity 210, the bottom of the heat dissipation component 130 is provided with a position-limit portion 430 in the form of a trapezoidal lap joint, and the heat dissipation component 130 can use the position-limit portion 430 to form a position-limit assembly with the through slot 220 of the base plate cover 120.

It is to be noted that the heat dissipation component 130 may outwardly extend downwardly to form the lower outwardly extending structure 330 or may outwardly extend upwardly to form the upper outwardly extending structure 330, and this embodiment does not impose any specific limitation thereon.

It is to be noted that the outwardly extending structure 330 of the heat dissipation component 130 may not replace the toothed pieces provided on the outer shell 1110, but instead, the outwardly extending structure 330 is placed in the original fin flow channels of the outer shell 1110 to form a densified teeth state.

It is to be noted that the heat dissipation component 130 is provided with the heat dissipation pipelines 230 in communication with the heat collection cavity, where the heat dissipation pipelines 230 may be in a honeycomb form, in a brachistochrone form, in an inclined line form, or in the form of a combination of the foregoing forms, and this embodiment does not impose any specific limitation thereon. For example: as shown in FIG. 12, when the heat dissipation pipelines 230 are in the brachistochrone form or the inclined line form, the anti-gravity high point of the heat dissipation pipelines 230 may be provided on the tooth tip side and the anti-gravity low point may be provided on the base plate side.

As shown in FIGS. 1 and 12, an anchor point 530 may be provided at the top of the heat dissipation component 130, and the protective cover 140 of the heat dissipator 1100 is assembled with the anchor point 530 of the heat dissipation component 130 of the heat dissipation assembly by means of riveting, and can provide a protective effect for the heat dissipation component 100. It is to be noted that the heat dissipation component 130 may also be assembled with the protective cover 140 by means of welding, and this embodiment does not impose any specific limitation thereon.

During operation, the liquid refrigerant (two-phase working medium) in the heat collection cavity 210 of the heat dissipation assembly 100 will rapidly absorb heat and vaporize, so the base plate of the heat dissipation assembly 100 may need sufficient pressure-bearing capability to reduce the occurrence of bulging, deformation, and other problems that may occur due to excessive internal pressure. This embodiment mainly enhances the connection strength between the base plate bottom 110 and the base plate cover 120 by providing the turbulation pieces 310 or the turbulation columns, or the like, in the heat collection cavity 210.

Figure 13:
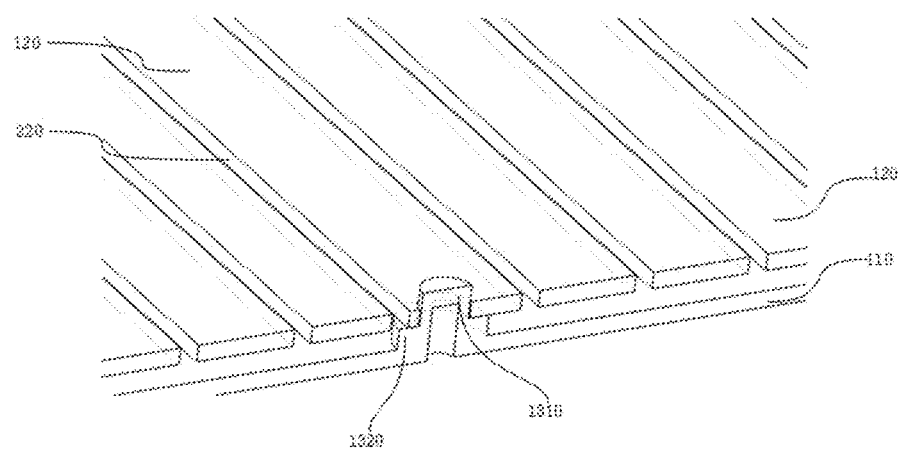
FIG. 13 is a structural schematic diagram of the assembly of a turbulation column of a heat dissipation assembly as provided in an embodiment of the present disclosure.

When in use, chips that generate heat are attached to the outer surface of the base plate bottom 110 to dissipate heat, and in order to reduce the contact thermal resistance between the attached surfaces, a screw locking method is usually used to make the PCB closely assembled with the base plate of the heat dissipation assembly 100, and thus the heat dissipation base plate may need to be configured with threaded holes for fixing and assembly of the PCB. As shown in FIG. 13, a concentric turbulation column with a threaded hole is provided in the heat collection cavity 210 in the heat dissipation assembly 100, the turbulation column including a first column body 1320 and a second column body 1310 concentrically disposed with the first column body 1320, where the radius of the first column body 1320 is greater than that of the second column body 1310, the first column body 1320 is disposed in the heat collection cavity 210, and the height of the first column body 1320 is equal to that of the heat collection cavity 210, and since the top and bottom faces of the first column body 1320 closely fit the inner cavity faces of the base plate bottom 110 and the base plate cover 120, respectively, the pressure-bearing strength of the base plate can be enhanced after welding, whereas the second column body 1310 is provided with a threaded hole therein, and the height of the second column body 1310 is greater than that of the first column body 1320. When the position of the threaded hole interferes with the heat dissipation component 130, the height of the second column body 1310 does not exceed the upper surface of the base plate cover 120 and the depth of the threaded hole does not penetrate the base plate cover 120; and when the position of the threaded hole does not interfere with the heat dissipation component 130, the height of the second column body 1310 may exceed the base plate cover 120 to match a threaded hole of a greater depth, so as to enhance the capability of assembly between the PCB and the base plate, thereby effectively reducing the contact thermal resistance between the chip and the base plate.

Embodiments of the present disclosure further provide a heat dissipator 1100 as shown in FIG. 11. The heat dissipator 1100 includes a heat dissipation assembly 100 and an outer shell 1110 as in the above embodiments, and the technical means, the problems solved, and the technical effects that can be achieved by the heat dissipator 1100 are consistent with those of the heat dissipation assembly 100 in the above embodiments, and are not repeated here. In order to better improve the effect of the heat dissipation assembly 100, the heat dissipation assembly 100 may need to be closely assembled with the outer shell 1110 of the heat dissipator 1100, and the heat dissipation assembly 100 and the outer shell 1110 may be assembled in the form of screwed sealing, or may be assembled in the form of friction stir welding, and this embodiment does not impose any specific limitation thereon.

Figure 14:
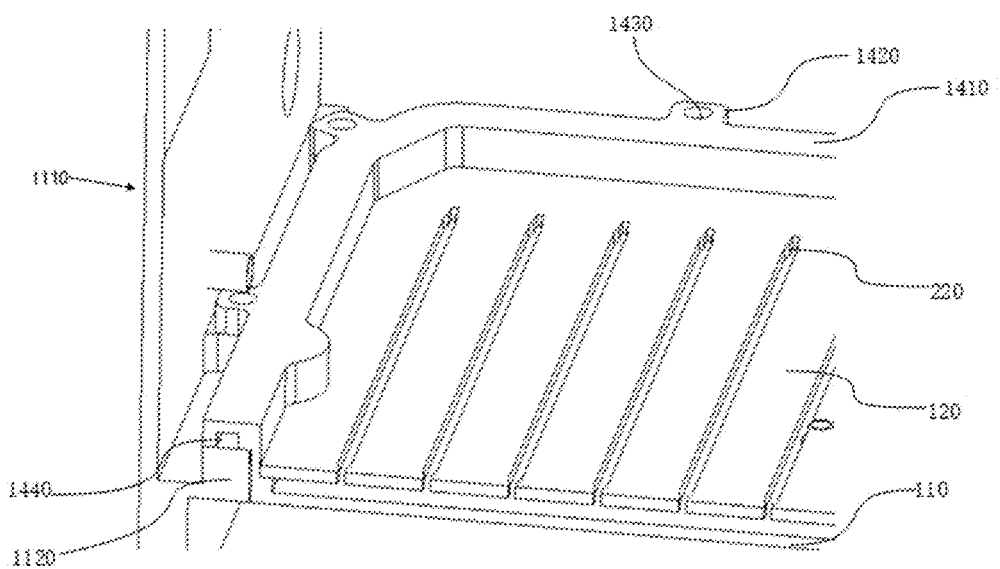
FIG. 14 is a structural schematic diagram of a heat dissipation assembly being connected to an outer shell in a screwed manner as provided in an embodiment of the present disclosure.

In an embodiment, when the heat dissipation assembly 100 is assembled with the outer shell 1110 in the form of screwed sealing, as shown in FIG. 14: taking the thermal relief region of the base plate bottom 110 as an inner contour boundary, an assembly flange 1410 higher than the base plate top face of the outer shell 1110 is formed through outward turning along the inner contour boundary towards the heat dissipation component 130 side; a plurality of lugs 1420 are provided on the contour edges of the assembly flange 1410, an assembly screw hole 1430 is provided in the center of the lug 1420, and a sealing groove 1440 is opened at the centerline of the lower side face of the assembly flange 1410; an assembly through slot is opened in the base plate of the outer shell 1110 taking an outer contour boundary of the base plate bottom 110 of the heat dissipation assembly as a reference, and an assembly tab 1120 is provided on the base plate top face of the outer shell 1110 according to a reference range of the boundary of the assembly through slot and the outer contour boundary of the assembly flange 1410 of the heat dissipation assembly, where the assembly tab 1120 is provided in a close against manner to the bottom face of the assembly flange 1410, and the assembly tab 1120 is provided with a threaded hole of the same size at a position corresponding to the assembly screw hole 1430 of the assembly flange 1410; and the heat dissipation assembly 100 fits and is position-limited to the assembly tab 1120 on the base plate top face of the outer shell 1110 by means of the assembly flange 1410 formed by the outward turning of the base plate bottom 110 and is fixedly assembled through the corresponding assembly screw hole 1430, and a sealing strip is provided at the flange sealing groove 1440.

Figure 15:
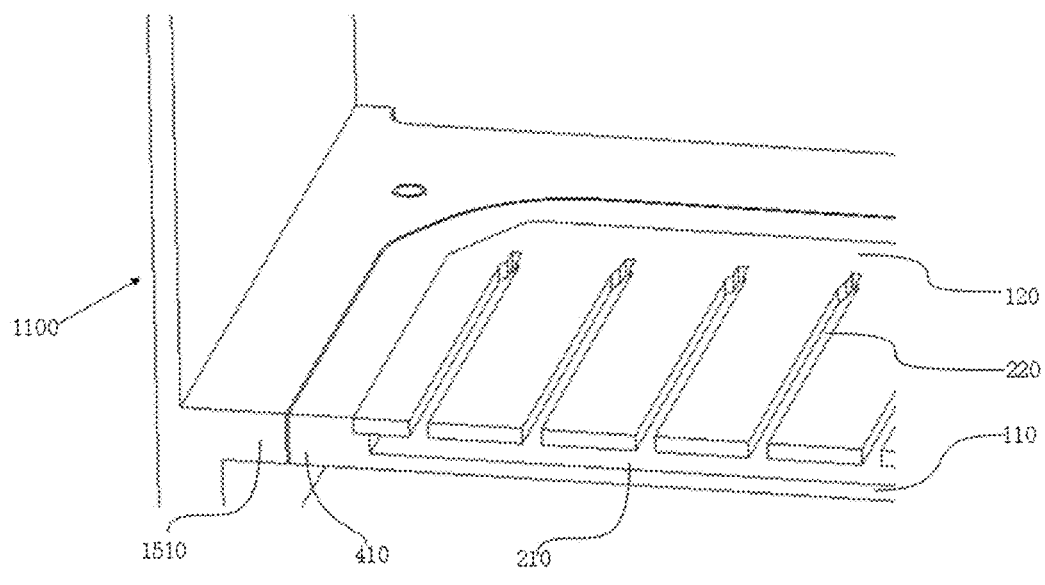
FIG. 15 is a structural schematic diagram of a heat dissipation assembly being connected to an outer shell in a friction stir welding form as provided in an embodiment of the present disclosure.

In an embodiment, when the heat dissipation assembly 100 is assembled with the outer shell 1110 in the form of friction stir welding, as shown in FIG. 15: taking the thermal relief region of the base plate bottom 110 as a reference boundary, the interior of the reference boundary is the center base plate of the base plate bottom 110; an outward expansion that is not less than the heat influence range of the friction stir welding process is performed along the reference boundary, with the distance of the outward expansion being greater than or equal to 2 mm, and the base plate bottom 110 is provided with a circumferential thickened region I 410 within the expansion range of the reference boundary, and the height of the circumferential thickened region I 410 is not less than the weld head depth of the friction stir welding process; an assembly through slot is opened on the base plate of the outer shell 1110 taking the circumferential outer edge boundary of the base plate bottom 110 of the heat dissipation assembly 100 as a reference, and an outward expansion in a range not less than a shaft-shoulder radius of the welding process is performed taking the boundary of the assembly through slot as a reference, and the base plate of the outer shell 1110 is locally thickened in the form of a circumferential thickened region II 1510 in the range of the expansion, with the height of the thickening being not less than the weld head depth of the friction stir welding process; and the circumferential thickened region I 410 of the base plate bottom 110 of the heat dissipation assembly and the circumferential thickened region II 1510 of the base plate of the outer shell 1110 are assembled in a close against manner by side surfaces and fixedly connected by means of friction stir welding. It is to be noted that friction stir welding refers to the use of the heat generated by the friction between the high-speed rotating welding tool and the workpiece to make the welded material locally melted, and when the welding tool moves forward along the welding interface, the plasticized material flows from the front to the back of the welding tool under the action of the rotating friction of the welding tool and forms a dense solid-phase weld under the extrusion of the welding tool.

An embodiment of the present disclosure includes: a heat dissipation assembly and a heat dissipator, where the heat dissipation assembly includes a base plate bottom, a base plate cover, a turbulation component, and a plurality of heat dissipation components, where the base plate cover is connected to the base plate bottom and forms a heat collection cavity for concentrating heat; the turbulation component includes a turbulation piece and a turbulation column and is provided in the heat collection cavity, where the turbulation piece is of equal height to the heat collection cavity, the turbulation piece is at least partially arranged closely against the base plate bottom, and the turbulation piece is at least partially arranged closely against the base plate cover, side walls of the turbulation piece being provided between the base plate cover and the base plate bottom, and the side walls of the turbulation piece being configured to support the base plate cover and the base plate bottom, and a cavity being provided between adjacent side walls of the turbulation piece; and the plurality of heat dissipation components are connected to the base plate cover, the heat dissipation components being provided with at least one or two heat dissipation pipelines, with the heat dissipation pipelines being in communication with the heat collection cavity. The top face of the turbulation piece closely fits the inner cavity face of the base plate cover, the bottom face of the turbulation piece closely fits the inner cavity face of the base plate bottom, and the side walls of the turbulation piece are sandwiched between the base plate cover and the base plate bottom to form a support, thus enabling the pressure-bearing capability, the structural strength and the reliability of the heat dissipator to be enhanced; a cavity is provided between adjacent side walls of the turbulation pieces, where the cavity may be used as a gas-liquid separation channel to make the liquid working medium flow along the wall face and make the gaseous working medium rise through the center of the cavity and be separated, thereby improving the two-phase circulation efficiency of the inner cavity of the base plate; and at the same time, when the high-temperature gas-liquid working medium flows through the turbulation piece, the high-temperature gas-liquid flow is obstructed by the turbulation piece, so that the high-temperature gas-liquid flow bypasses the turbulation piece and forms a vortex on the side of the turbulation piece, which destroys the thermal boundary layer on the surface of the turbulation piece, so that the thermal resistance can be significantly reduced, and the heat transfer coefficient can be increased, thus functioning to enhance heat transfer.

Although the embodiments of the present disclosure have been described in detail above with reference to the accompanying drawings, the present disclosure is not limited to the above embodiments, and various changes may be made within the knowledge of those of ordinary skill in the art without departing from the purpose of the present disclosure.

What is claimed is:

1. A heat dissipation assembly, comprising:
a base plate bottom;
a base plate cover connected to the base plate bottom and forming a heat collection cavity for concentrating heat;
a turbulation component provided in the heat collection cavity, the turbulation component comprising at least one turbulation piece, wherein the height of the turbulation piece is equal to that of the heat collection cavity, the turbulation piece is at least partially arranged closely against the base plate bottom, and the turbulation piece is at least partially arranged closely against the base plate cover, side walls of the turbulation piece are provided between the base plate cover and the base plate bottom, and the side walls are configured to support the base plate cover and the base plate bottom, and a cavity is provided between adjacent side walls of the turbulation piece; and
a plurality of heat dissipation components connected to the base plate cover, wherein the heat dissipation components are provided with at least one heat dissipation pipeline, the heat dissipation pipeline is provided in communication with the heat collection cavity.

2. The heat dissipation assembly of claim 1, wherein the turbulation piece comprises a plurality of array elements, cross-sectional shapes of the array elements comprising at least one of:
a zig-zag shape;
a trapezoidal shape;
a rectangular shape;
a Z-shape;
a V-shape; or
a W-shape.

3. The heat dissipation assembly of claim 1, wherein an approach for arranging adjacent turbulation pieces comprise at least one of:
a spaced arrangement; or
a close against arrangement.

4. The heat dissipation assembly of claim 3, wherein the structure of side walls of two turbulation pieces provided in the close against manner is a parallel-aligned structure, or a locally staggered overlapping structure formed in an unaligned manner.

5. The heat dissipation assembly of claim 4, wherein two or more turbulation piece monolithic structures provided in the close against manner are configured to combine to form an integral complex turbulation piece monolithic structure.

6. The heat dissipation assembly of claim 1, wherein the base plate cover is provided with a through slot, the heat dissipation component is assembled with the through slot in a position-limited manner by a position-limit portion at the bottom, and the heat dissipation pipeline is in communication with the heat collection cavity through the through slot.

7. The heat dissipation assembly of claim 6, wherein a portion of the turbulation piece arranged closely against the base plate cover is provided in a staggered manner with the through slot to prevent the turbulation piece from obscuring the through slot.

8. The heat dissipation assembly of claim 6, wherein a portion of the turbulation piece arranged closely against the base plate cover is provided in a staggered manner with the heat dissipation pipeline to prevent the turbulation piece from obscuring the heat dissipation pipeline.

9. The heat dissipation assembly of claim 1, wherein the base plate bottom is provided with a turbulation column, the turbulation column comprising a first column body and a second column body concentrically disposed with the first column body, wherein the radius of the first column body is greater than that of the second column body, the first column body is disposed in the heat collection cavity, and the height of the first column body is equal to that of the heat collection cavity, and the second column body is provided with a threaded hole, and the height of the second column body is greater than that of the first column body.

10. The heat dissipation assembly of claim 1, wherein the heat dissipation component comprises an outwardly extending structure, the outwardly extending structure is provided in an extending manner on two sides of the heat dissipation component in the direction of gravity, and the outwardly extending structure is configured to make a dimension of the heat dissipation component in the direction of gravity greater than a longitudinal dimension of the base plate bottom.

11. The heat dissipation assembly of claim 1, wherein a shape structure of the heat dissipation pipeline comprises at least one of:
a honeycomb shape;
a brachistochrone shape; or
an inclined line shape.

12. A heat dissipator, comprising a heat dissipation assembly, the heat dissipation assembly comprising:
a base plate bottom;
a base plate cover connected to the base plate bottom and forming a heat collection cavity for concentrating heat;
a turbulation component provided in the heat collection cavity, the turbulation component comprising at least one turbulation piece, wherein the height of the turbulation piece is equal to that of the heat collection cavity, the turbulation piece is at least partially arranged closely against the base plate bottom, and the turbulation piece is at least partially arranged closely against the base plate cover, side walls of the turbulation piece are provided between the base plate cover and the base plate bottom, and the side walls are configured to support the base plate cover and the base plate bottom, and a cavity is provided between adjacent side walls of the turbulation piece; and
a plurality of heat dissipation components connected to the base plate cover, wherein the heat dissipation components are provided with at least one heat dissipation pipeline, the heat dissipation pipeline is provided in communication with the heat collection cavity.

13. The heat dissipator of claim 12, further comprising an outer shell, wherein the heat dissipation assembly is sealingly connected to the outer shell.

14. The heat dissipator of claim 13, wherein the heat dissipation assembly is connected to the outer shell in a screwed manner; or
the heat dissipation assembly is connected to the outer shell by means of friction stir welding.

15. The heat dissipator of claim 12, wherein the turbulation piece comprises a plurality of array elements, cross-sectional shapes of the array elements comprising at least one of:
a zig-zag shape;
a trapezoidal shape;
a rectangular shape;
a Z-shape;
a V-shape; or
a W-shape.

16. The heat dissipator of claim 12, wherein an approach for arranging adjacent turbulation pieces comprise at least one of:
   a spaced arrangement; or
   a close against arrangement.

17. The heat dissipator of claim 16, wherein the structure of side walls of two turbulation pieces provided in the close against manner is a parallel-aligned structure, or a locally staggered overlapping structure formed in an unaligned manner.

18. The heat dissipator of claim 17, wherein two or more turbulation piece monolithic structures provided in the close against manner are configured to combine to form an integral complex turbulation piece monolithic structure.

19. The heat dissipator of claim 12, wherein the base plate cover is provided with a through slot, the heat dissipation component is assembled with the through slot in a position-limited manner by a position-limit portion at the bottom, and the heat dissipation pipeline is in communication with the heat collection cavity through the through slot.

20. The heat dissipator of claim 19, wherein a portion of the turbulation piece arranged closely against the base plate cover is provided in a staggered manner with the through slot to prevent the turbulation piece from obscuring the through slot.

\* \* \* \* \*